US008190365B2

(12) United States Patent
Chansarkar et al.

(10) Patent No.: US 8,190,365 B2
(45) Date of Patent: May 29, 2012

(54) SYSTEMS AND METHODS FOR PROCESSING NAVIGATIONAL SOLUTIONS

(75) Inventors: Mangesh Chansarkar, Irvine, CA (US); Daniel Liao, Irvine, CA (US)

(73) Assignee: CSR Technology Inc., San Jose, CA (US)

( * ) Notice: Subject to any disclaimer, the term of this patent is extended or adjusted under 35 U.S.C. 154(b) by 875 days.

(21) Appl. No.: 11/934,831

(22) Filed: Nov. 5, 2007

(65) Prior Publication Data

US 2009/0119015 A1    May 7, 2009

(51) Int. Cl.
*G01S 19/08* (2010.01)
(52) U.S. Cl. .................. 701/469; 701/475; 342/357.45
(58) Field of Classification Search .................. 701/215
See application file for complete search history.

(56) References Cited

U.S. PATENT DOCUMENTS

| | | |
|---|---|---|
| 6,411,892 B1 | 6/2002 | Van Diggelen |
| 6,417,801 B1 | 7/2002 | Van Diggelen |
| 6,429,814 B1 | 8/2002 | Van Diggelen et al. |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,820 B2 | 4/2003 | LaMance et al. |
| 6,560,534 B2 | 5/2003 | Abraham et al. |
| 6,606,346 B2 | 8/2003 | Abraham et al. |
| 6,704,651 B2 | 3/2004 | Van Diggelen |
| 2003/0182056 A1 | 9/2003 | Nozaki et al. |
| 2005/0015198 A1 | 1/2005 | Kee et al. |
| 2005/0278119 A1 | 12/2005 | Zimmerman et al. |
| 2006/0152409 A1 | 7/2006 | Raman et al. |
| 2006/0229805 A1 | 10/2006 | Diggelen |

OTHER PUBLICATIONS

International Search Report and Written Opinion, dated Dec. 24, 2008.

*Primary Examiner* — Shelley Chen
(74) *Attorney, Agent, or Firm* — RatnerPrestia (57) ABSTRACT

Systems and methods for processing navigational solutions are provided. In this regard, a representative system includes a navigational computing device comprising a processor and memory that stores a navigational solution manager that is executed by the processor to provide a receiver position. The navigational solution manager is configured to collect navigational data from at least one satellite vehicle, compute initialization navigational measurements based on the collected navigational data, and compute the receiver position using the initialization navigation measurements.

22 Claims, 5 Drawing Sheets

SYSTEMS AND METHODS FOR PROCESSING NAVIGATIONAL SOLUTIONS

TECHNICAL FIELD

The present disclosure is generally related to signal processing and, more particularly, is related to systems and methods for processing navigational solutions.

BACKGROUND

Typically, a global positioning system (GPS) can provide a user with a position, velocity, and time (PVT) solution, sometimes referred to as a navigation solution. The global positioning system includes a GPS receiver which typically incorporates current measurements from four or more satellites to update its most recent PVT solution. The navigation solution includes pseudorange, which can be referred to as a first-approximation measurement for the distance between a satellite and a navigation receiver, such as, for example, global positioning system (GPS) receivers. To determine a receiver position, a navigation receiver typically determines the ranges to (at least) three satellites as well as their positions at the time of transmitting. The satellites positions can be calculated for any point in time with known satellite orbital parameters, which specify that satellites' orbits are represented by way of a model of two point masses obeying the Newtonian laws of motion and the inverse-square law of gravitational attraction.

The pseudoranges can be computed using measured time that the navigation receiver receives signals from the satellite, multiplied by the speed of light. To measure this time, the relationship between the internal receiver time and GPS time is typically known. This is done by introducing the receiver clock offset $\Delta t$ into the positional computation, utilizing at least one extra satellite signal. With four signals, solutions for the receiver position along the x-, y-, z- and $\Delta t$-axes can be computed.

The reason for pseudoranges rather than actual ranges is a result of uncertain receiver clock offset, among others. Typically, if the pseudoranges increase with larger uncertainties, the computation of the receiver position becomes less accurate. Thus, a heretofore unaddressed need exists in the industry for computing an accurate receiver position tolerant to uncertainties.

SUMMARY

Systems and methods for processing navigational solutions are provided. In this regard, a representative system includes a navigational computing device comprising a processor and memory that stores a navigational solution manager that is executed by the processor to provide a receiver position. The navigational solution manager is configured to: collect navigational data from at least one satellite vehicle, compute initialization navigational measurements based on the collected navigational data, and compute the receiver position using the initialization navigation measurements.

A representative method for processing navigational solutions includes collecting navigational data from at least one satellite vehicle; computing initialization navigational measurements based on the collected navigational data; and computing the receiver position using the initialization navigation measurements.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a navigational solution can be processed.

Figure 1:
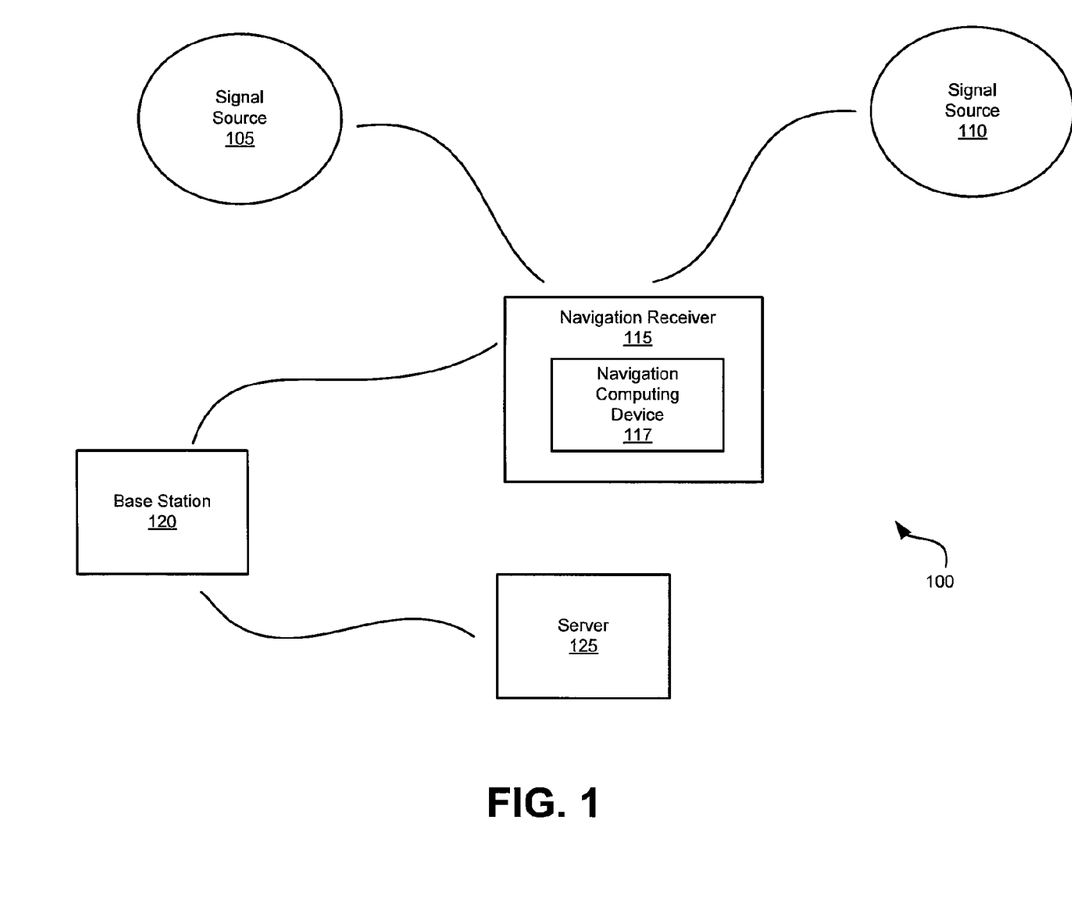
FIG. 1 is a block diagram that illustrates a system overview for determining a location of a navigation receiver.

FIG. 1 is a block diagram that illustrates a system overview for determining a location of a navigation receiver 115. A simple system 100 comprises a plurality of signal sources 105, 110, and a navigation receiver 115. Alternatively or additionally, a more complex system 100, such as an assisted global positioning system (GPS), further comprises a base station 120 and a server 125. Although only one navigation receiver 115, one base station 120, and one server 125 are shown in system 100, the system 100 can include multiple navigation receivers, multiple base stations and/or multiple servers. Alternatively or additionally, the server 125 may be co-located with the base station 120 or with the navigation receiver 115.

The signal sources 105, 110 include GPS satellites, among others. The signal sources 105, 110 generally orbit above the location of the navigation receivers 115 at any given time. The navigation receiver 115 has subsystem components, such as, for example, a navigation computing device 117 and receiving mechanism (not shown), among others. The receiving mechanism includes, but is not limited to, an antenna and GPS decoder, among others, for receiving and decoding GPS signals from the signal sources 105, 110. The navigation computing device 117 can process navigational solutions based on the GPS signals. A method of processing the navigational solution is described in relation to FIGS. 3 and 5. A representative architecture of the navigational computing device 117 is described in relation to FIG. 2.

The navigation receiver 115 include, but is not limited to, GPS receivers, cell phones with embedded signal receivers, and Personal Digital Assistants (PDAs) with embedded signal receivers, among others. The signal sources 105, 110 transmit signals to the navigation receiver 115, which uses the GPS signals to determine the location, speed, and direction of the navigation receiver 115.

Figure 2:
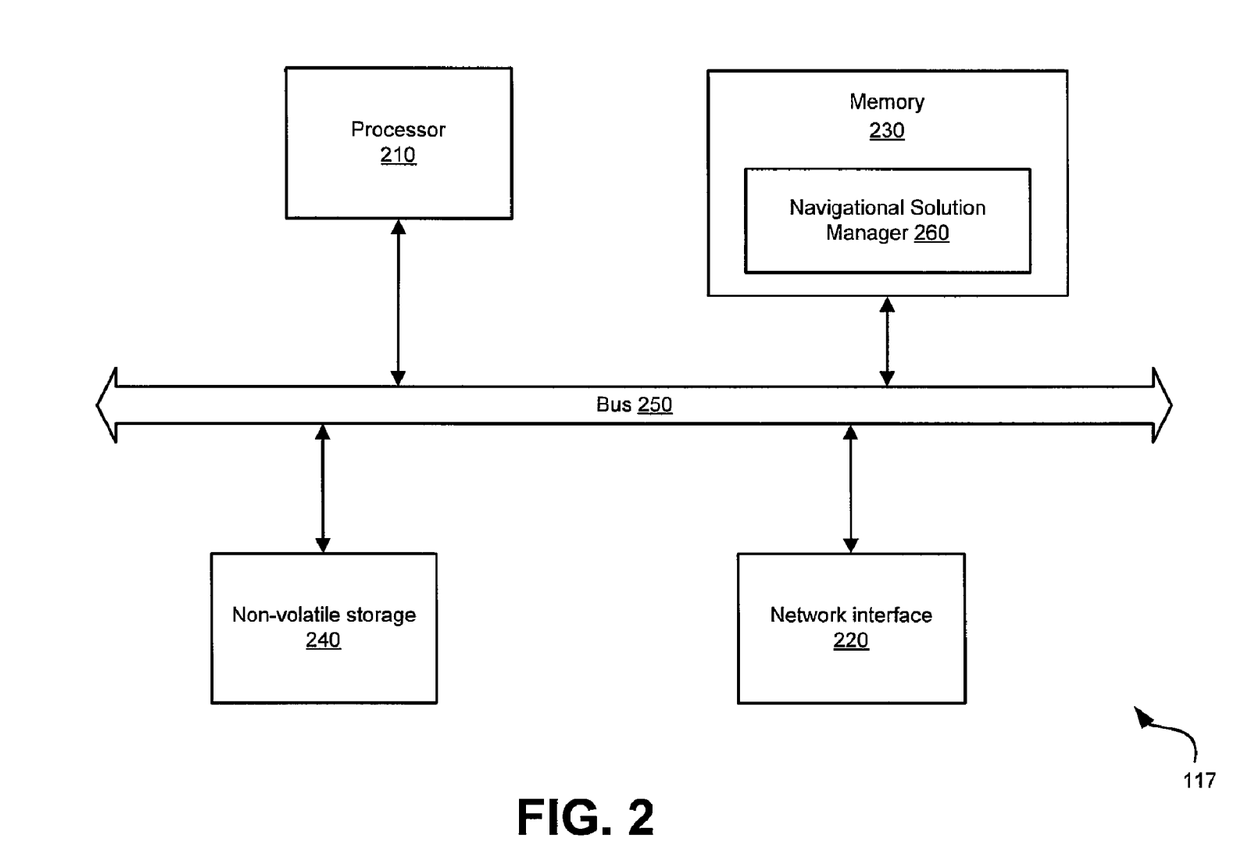
FIG. 2 is a block diagram of a navigation computing device of a navigation receiver, such as that shown in FIG. 1.

FIG. 2 is a block diagram of a navigation computing device 117 of a navigation receiver 115, such as that shown in FIG. 1. The computing device 117 contains a number of components that are well known in the art of GPS, including a processor 210, a network interface 220, memory 230, and non-volatile storage 240. Examples of non-volatile storage include, for example, a hard disk, flash RAM, flash ROM, EEPROM, etc. These components are coupled via a bus 250. The memory 230 includes a navigational solution manager 260 that facilitates processing navigational solution and accuracy based on GPS signals, such as, for example, Doppler measurements. The navigational solution manager 260 is described in relation to FIGS. 4 and 5. The memory 230 contains instructions which, when executed by the processor 210, implement at least a portion of the methods and systems disclosed herein, particularly the navigational solution manager 260. Omitted from FIG. 2 are other conventional components, known to those skilled in the art that are unnecessary to explain the operation of the device 117.

The navigational solution manager 260 can be implemented in software, hardware, or a combination thereof. In some embodiments, the navigational solution manager 260 is implemented in software that is stored in a memory and that is executed by a suitable microprocessor (μP) situated in a computing device. However, the navigational solution manager 260 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

Figure 3:
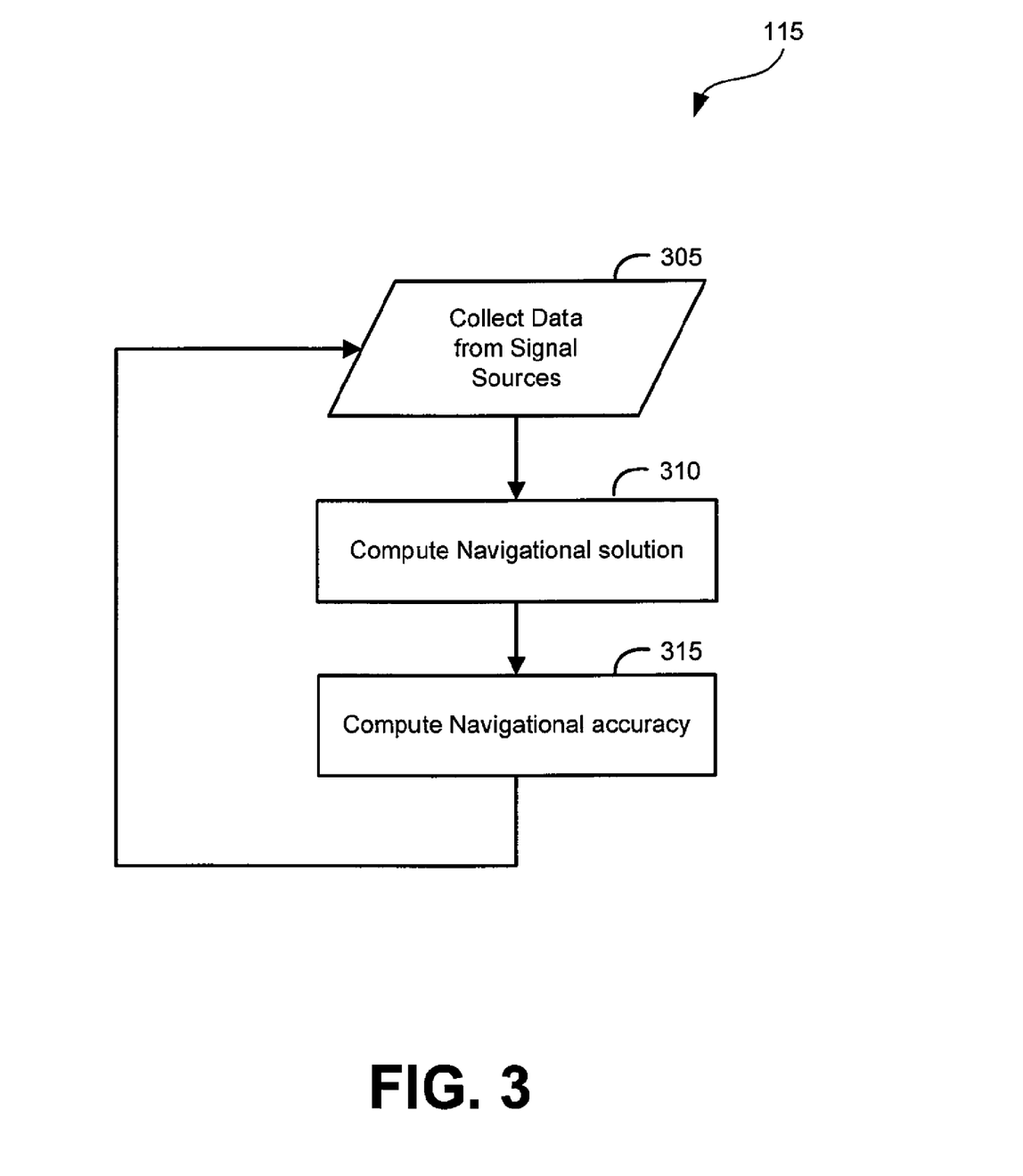
FIG. 3 is a high-level flow diagram that illustrates an embodiment of the architecture, functionality, and/or operation of the navigation receiver, such as that shown in FIG. 1, for processing navigational solutions.

FIG. 3 is a high-level flow diagram that illustrates an embodiment of the architecture, functionality, and/or operation of the navigation receiver 115, such as that shown in FIG. 1, for processing navigational solutions. Beginning with step 305, the navigation receiver 115 collects data from signal sources. The collected data include, but are not limited to, Doppler measurements, among others. Step 310 computes a navigational solution based on the collected data. The computed navigational solution includes a set of initialization navigational measurements for computing a navigational accuracy, as referred in Step 315. Below are various representative methods for computing a navigational solution. It should be noted that the various methods include, but are not limited to, a five (5) dimensional Doppler equation that relates position, clock and time ambiguity to the collected Doppler measurements from at least five (5) satellite vehicles 105, 110.

A. Navigational Solution Computation Having Accurate Time

A four (4) dimensional equation can be solved to obtain a clock bias and a receiver position in three (3) dimensions, e.g., x, y, and z coordinates, particularly when time was accurately decoded from GPS satellites and GPS satellite ephemeris was obtained. The equation includes, but is not limited to, a linear matrix equation, which is iterated at least once until the solution converges. An exemplary equation formulation is as follows:

$$Z = HX + v \tag{1}$$

where v refers to a measurement noise vector; X refers to a state vector that is a deviation of true values from approximate values, which include, but are limited to, at least three coordinates of the receiver position and the clock bias; and Z refers to a measurement vector that is the difference between a measured pseudorange and a computed pseudorange. H refers to a design matrix that represents the linearized relationship between Z and X. The design matrix is a function of satellite line of sight (LOS) vectors, which are determined by satellite position and the receiver position. A satellite position can be computed by using its valid ephemeris and time information.

If more than four (4) satellite pseudorange measurements, their ephemeris and precise time are available, a least-square estimation can be applied to estimate the state vector X. Following is an example of a weighted least-square solution:

$$\hat{X} = (H^T R^{-1} H)^{-1} H^T R^{-1} Z \tag{2}$$

where $R^{-1}$ refers to a positive definite weighting matrix. Since the H matrix contains information related to the receiver position, the computation of equation (2) includes at least one iteration for convergence.

B. Five (5) Dimensional Position Computation when Approximate Time and Location is Available When time is not accurate such that approximate time is available and approximate location is the available, the measurement equation (1) can be modified to obtain an accurate location. An exemplary modified measurement equation is given as follows:

$$z = [\,-LOS \quad 1 \quad LOS \cdot V\,] \begin{bmatrix} \Delta p_x \\ \Delta p_y \\ \Delta p_z \\ \Delta B \\ \Delta T \end{bmatrix} \tag{3}$$

For multiple satellites, the measurement equation (1) can be modified as follows:

$$\begin{bmatrix} z_1 \\ z_2 \\ \vdots \\ \vdots \\ z_m \end{bmatrix} = \begin{bmatrix} -LOS_1 & 1 & LOS_1 \cdot V_1 \\ -LOS_2 & 1 & LOS_2 \cdot V_2 \\ \vdots & \vdots & \vdots \\ \vdots & \vdots & \vdots \\ -LOS_i & 1 & LOS_i \cdot V_i \end{bmatrix} \begin{bmatrix} \Delta p_x \\ \Delta p_y \\ \Delta p_z \\ \Delta B \\ \Delta T \end{bmatrix} \quad (4)$$

where $LOS_i$ refers to the unit vector along the line of sight for the i-th satellite and $V_i$ refers to the velocity of the i-th satellite. The product $LOS_i * V_i$ refers to a vector dot product.

If five or more measurements are available, a weighted least-square method can be used to estimate the error parameters of equation (4) using equation (2). Because of the nature of non-linearity of measurements and the dependency of the design matrix on the estimated receiver position, the computation of equations (3) and (4) includes at least one iteration for convergence. In each iteration, the measurement vector and design matrix are updated.

C. Position Computation Equations using Doppler Measurements

One exemplary method of computing receiver position using range rate (Doppler) measurements is described as follows. The basic measurement equation to be solved is as follows:

$$z_v = HX + v \quad (5)$$

where $z_v$ refers to the Doppler or delta range difference between measured delta range and predicted delta range minus the average value of the vector elements; X and v having the same meaning in equation (1); and observation vector H is defined as follows:

$$z_v = \begin{bmatrix} z_1 \\ z_2 \\ \vdots \\ z_k \end{bmatrix} \quad (6)$$

$$H = \begin{bmatrix} v_x^1 & v_y^1 & v_z^1 & a_1 \\ v_x^2 & v_y^2 & v_z^2 & a_2 \\ \cdots & \cdots & \cdots & \cdots \\ v_x^k & v_y^k & v_z^k & a_k \end{bmatrix}$$

where $v_x^k$ refers to x velocity of the k-th satellite divided by product of distance of k-th satellite from receiver and L1 wavelength; $v_y^k$ refers to y velocity of the k-th satellite divided by product of distance of k-th satellite from receiver and L1 wavelength; $v_z^k$ refers to z velocity of the k-th satellite divided by product of distance of k-th satellite from receiver and L1 wavelength; L1 wavelength refers to 19 cm; $a_k$ refers to line of sight acceleration of k-th satellite divided by speed of light.

The computation of equation (6) includes at least one iteration for convergence and at every iteration the design matrix can be recomputed. Also, at every iteration the average value of the elements of vector $z_v$ can be recomputed.

D. Modified Position Computation Equations using Doppler Measurements

When accurate time is not available the equations (5) and (6) can be modified to estimate a time ambiguity and a five (5) dimensional solution can be used for computation. The equations are similar to equations (3) and (4) and described as the following:

$$\begin{bmatrix} z_1 \\ z_2 \\ \vdots \\ \vdots \\ z_k \end{bmatrix} = \begin{bmatrix} v_x^1 & v_y^1 & v_z^1 & a_1 & LOS_1 * A_1 \\ v_x^2 & v_y^2 & v_z^2 & a_2 & LOS_2 * A_2 \\ \vdots & \vdots & \vdots & \vdots & \vdots \\ \vdots & \vdots & \vdots & \vdots & \vdots \\ v_x^k & v_y^k & v_z^k & a_k & LOS_k * A_k \end{bmatrix} \begin{bmatrix} \Delta p_x \\ \Delta p_y \\ \Delta p_z \\ \Delta B \\ \Delta T \end{bmatrix} \quad (7)$$

where $LOS_k$ refers to the unit vector along line of sight for k-th satellite, $A_k$ refers to the acceleration of k-th satellite, and $LOS_k * A_k$ refers to a vector dot product.

The equation (7) can include multiple iterations to achieve convergence and the design matrix can be recomputed at every iteration (similar for equation (4)). In addition, the average value of the elements of vector $z_{can}$ be recomputed.

It should be noted that other U.S. patent applications disclose various methods of computing a navigation solution, such as, U.S. Pat. No. 6,618,670, entitled "Resolving Time Ambiguity In GPS Using Over-Determined Navigation Solution," having application Ser. No. 09/952,548, filed Sep. 14, 2001, which is entirely incorporated herein by reference. The '548 patent application discloses methods and apparatuses for determining a user position based on a minimization of errors associated with clock bias, noise, multipath, or other uncertainties. In particular, the time ambiguity can be resolved to lower error limits by overdetermining the position of a GPS receiver.

Figure 4:
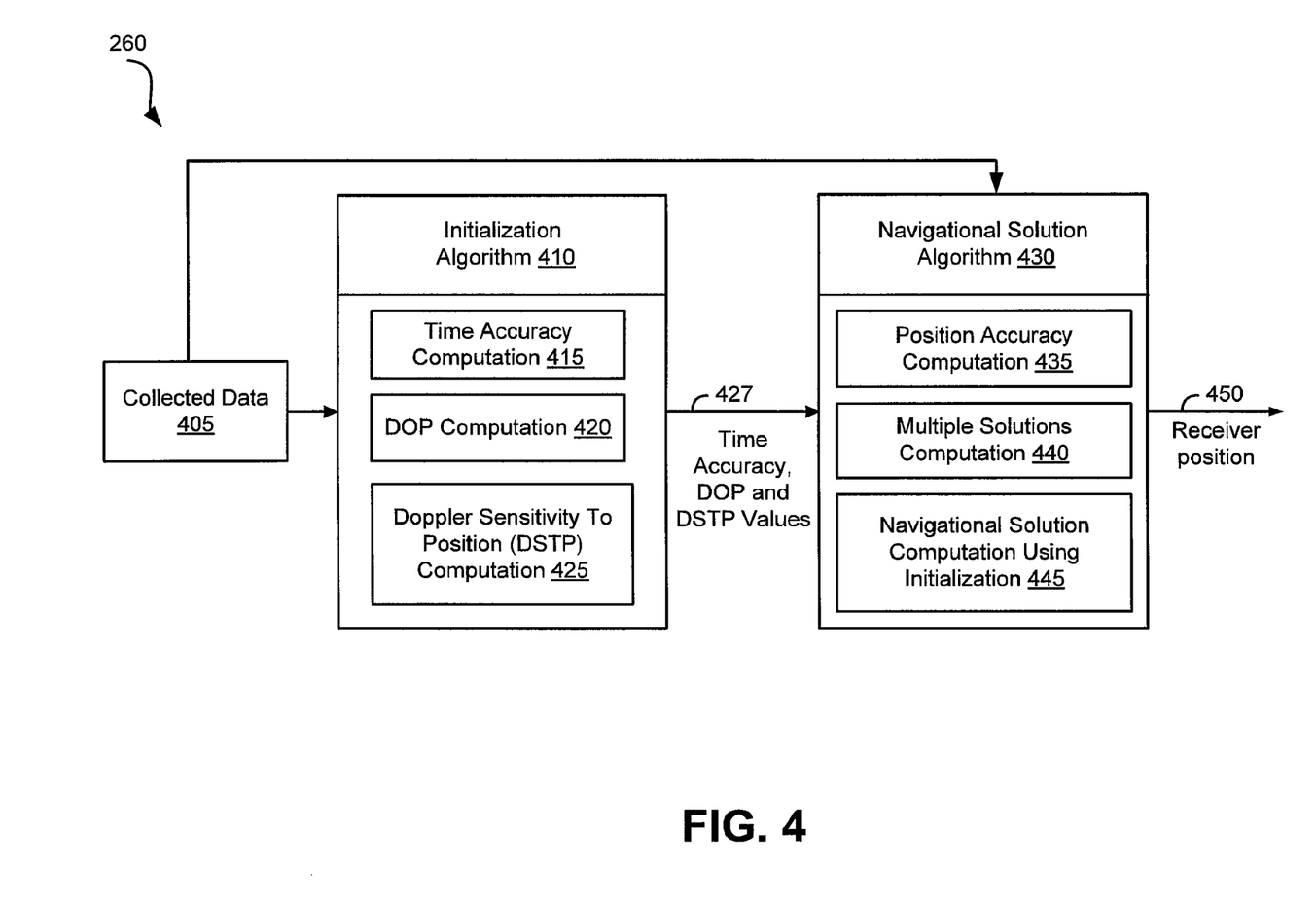
FIG. 4 is a block diagram that illustrates an embodiment of the architecture, functionality, and/or operation of a navigational solution manager, such as that shown in FIG. 2, for processing navigational solutions.

FIG. 4 is a block diagram that illustrates an embodiment of the architecture, functionality, and/or operation of a navigational solution manager 260, such as that shown in FIG. 2, for processing navigational solutions. Block 405 collects navigational data from satellites orbiting above a navigation receiver 115, such as that described in relation to FIG. 1. The collected navigational data is inputted into the initialization algorithm 410, which includes, but is not limited to, time accuracy computation 415, Dilution of Precision (DOP) computation 420, and Doppler sensitivity to position (DSTP) computation 425, among others.

The initialization algorithm 410 can generate initialization navigational measurements using at least one navigational solution equation mentioned above in relation to FIG. 3, such as equations (1)-(7). The initialization algorithm 410 provides the initialization navigational measurements 427 to a navigational solution algorithm 430. The initialization navigational measurements include, but are not limited to, Doppler sensitivity to position, time, clock and DOP, among others. The initialization algorithm 410 is further described in relation to FIG. 5.

The navigational solution algorithm 430 includes, but is not limited to, a position accuracy computation 435, multiple solutions computation 440 and navigational solution computation using initialization navigational measurements 445. The navigational solution algorithm 430 can generate a receiver position 450 within a certain accuracy using at least one navigational solution equation mentioned above in relation to FIG. 3, such as equations (1)-(7).

In general, if the position accuracy computation 435 computes a position accuracy value above an accuracy threshold, then the navigational solution computation 445 is used to compute the receiver position 450. If the position accuracy value below the accuracy threshold, then the multiple solutions computation 440 is used to compute the receiver position 450. Alternatively or additionally, both computations 440, 445 are computed in real-time to provide at least two (2) possible receiver position 450. The navigational solution algorithm 430 is further described in relation to FIG. 5.

Figure 5:
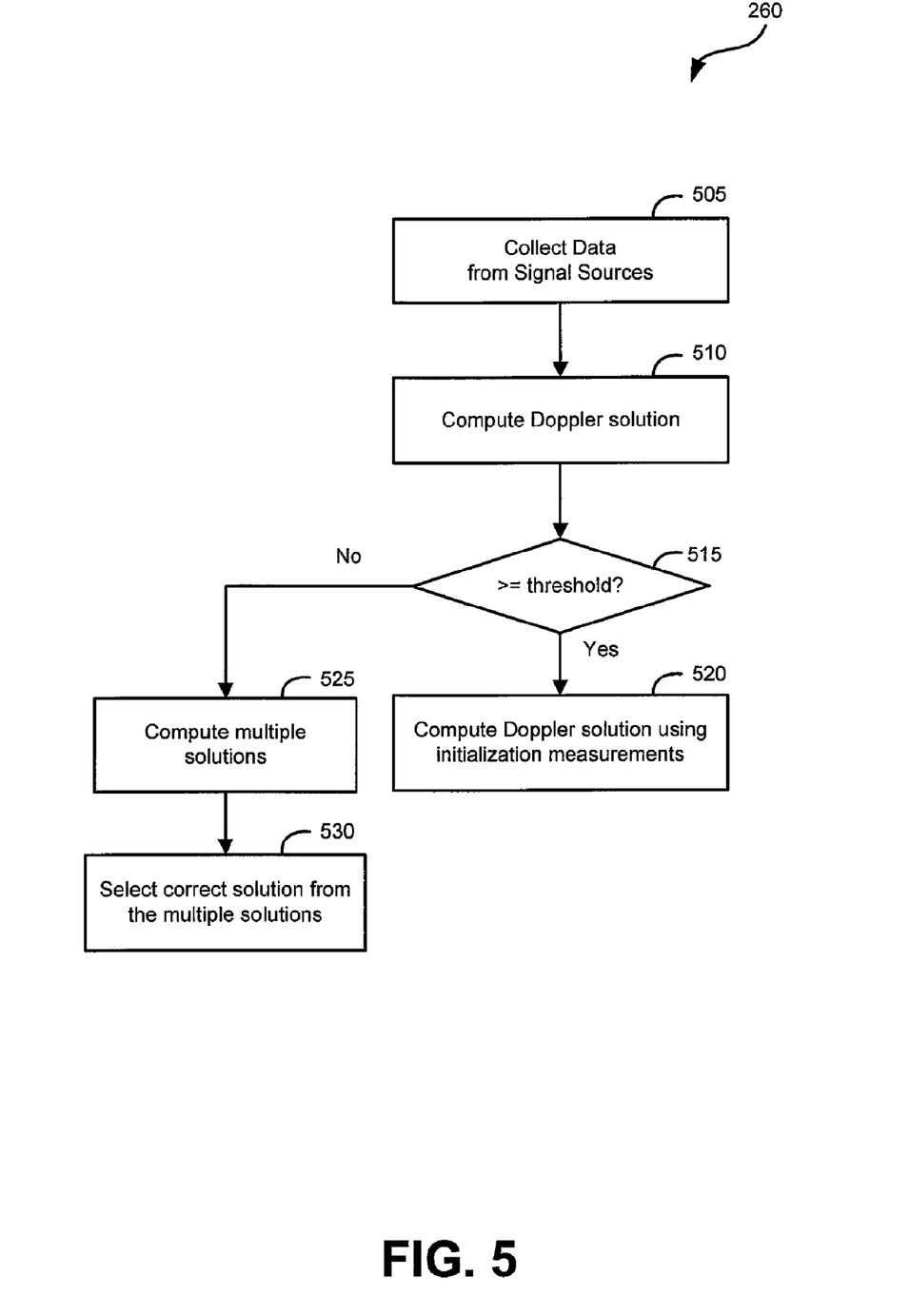
FIG. 5 is a flow diagram that illustrates an embodiment of the architecture, functionality, and/or operation of the navigation solution manager of the navigation receiver, such as that shown in FIG. 2, for processing navigational solutions.

FIG. 5 is a flow diagram that illustrates an embodiment of the architecture, functionality, and/or operation of the navigation solution manager 260, such as that shown in FIG. 2, for processing navigational solutions using Doppler measurement. Beginning with step 505, the navigation solution manager 260 collects Doppler measurements from signal sources. Step 510 computes a Doppler solution based on the collected data, using at least one navigational solution equation mentioned above in relation to FIG. 3, such as equations (1)-(7).

The Doppler solution includes, but is not limited to, a computed position accuracy and a set of initialization navigational measurements based on the collected Doppler measurements. The initialization navigational measurements include, but are not limited to, Doppler sensitivity to position, time, clock and Dilution of Precision (DOP), among others.

Dilution of precision (DOP) generally refers to the geometric strength of satellite configuration on GPS accuracy. When the satellites are close together orbiting above the navigation receiver, the geometric strength of the satellite configuration is considered weak and the DOP value is high. When the satellites are far apart, the geometric strength is considered strong, and the DOP value is low. Thus, a low DOP value represents a better GPS positional accuracy due to the wider angular separation between the satellites used to calculate the receiver position.

Step 515 determines whether the computed position accuracy passes an accuracy threshold, such as, for example, greater than or equal to 75 kilometers. Alternatively or additionally, the Doppler solution can be constructed to solve for, but is not limited to, position, clock and time ambiguity, among others. Accordingly, step 515 can determine whether a Doppler sensitivity to position passes a Doppler sensitivity threshold, such as, for example, approximately 1 Hz per Km. Step 515 can further determine whether the time passes a time threshold, such as, for example, approximately 10 Hz, and whether the DOP passes a DOP threshold, such as, for example, from 1 to 6 range.

If the computed position accuracy is less than the accuracy threshold, step 525 computes multiple Doppler solutions using the collected Doppler measurements. Step 530 selects a correct navigational solution from the multiple Doppler solutions. For example, a five (5) dimensional equation can be used to compute the position accuracy. The five (5) dimensional equation can be derived from multiple integer millisecond hypotheses. That is, if a millisecond ambiguity is approximately 1 millisecond on each satellite, then for five (5) satellites, 32 possible solutions can be computed. One of the 32 possible solutions is selected to be the correct navigational solution.

If the computed position accuracy is greater than or equal to the accuracy threshold, step 520 computes a Doppler solution based on the set of initialization navigational measurements using at least one navigational solution equation mentioned above in relation to FIG. 3, such as equations (1)-(7). Alternatively or additionally, if the set of initialization navigational measurements pass initialization thresholds, step 520 computes a Doppler solution based on the set of initialization navigational measurements. For example, if the Doppler sensitivity to position, the time, and the DOP are approximately 1 Hz per Km, approximately 10 Hz, and approximately 4, respectively, then the receiver position can be computed to an accuracy of approximately 40 Km, for example. The computed Doppler solution from step 520 can be used in the resolution of millisecond ambiguities.

For computed position accuracy greater than the accuracy threshold, the computed Doppler solution in step 520 generally includes two (2) position computations as opposed to possibly 32 position computations, such as that described in relation to steps 525 and 530. The two (2) computations generally include computing the initialization navigational measurements and the receiver position based on the initialization navigational measurements. The decrease from 32 position computations to 2 position computations reduces significant burden on the computing resource of the navigation receiver, such as that shown in FIG. 1. Alternatively or additionally, all of the steps 520, 525, 530 are performed in real-time to provide receiver positions. Alternatively or additionally, the step of determining whether the set of initialization navigational measurements pass initialization thresholds is performed before step 520 rather than performing the step of determining whether the computed position accuracy passes the accuracy threshold.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A navigational computing device comprising:
a processor; and
memory that stores a navigational solution manager that is executed by the processor to provide a receiver position, the navigational solution manager being configured to:
collect navigational data from at least one satellite vehicle,
compute a plurality of initialization navigational measurements based on the collected navigational data, the initialization navigational measurements indicating navigational accuracy of the collected navigational data,
compute the receiver position using the initialization navigational measurements if the computed initialization navigational measurements pass a corresponding initialization threshold, and
compute the receiver position independent of the initialization navigational measurements if the computed initialization navigational measurements do not pass the corresponding initialization threshold.

2. The navigational computing device as defined in claim 1, wherein the computation of the initialization navigational measurements includes a five (5) dimensional Doppler equation that relates position, clock and time ambiguity to the collected Doppler measurements from at least five (5) satellite vehicles.

3. The navigational computing device as defined in claim 1, wherein the initialization navigational measurements include Doppler sensitivity to position, time, clock and Dilution of Precision (DOP).

4. The navigational computing device as defined in claim 3, wherein if the Doppler sensitivity to position, time, and DOP are approximately 1 Hz per Km, approximately 10 Hz and approximately 4, respectively, then the receiver position is computed to have an accuracy of approximately 40 Km.

5. The navigational computing device as defined in claim 1, wherein the navigational solution manager is further configured to:
compute a position accuracy value based on the collected navigational data, determine whether the position accuracy value is greater than an accuracy threshold, and
responsive to the position accuracy value being greater than the accuracy threshold, compute the receiver position based on the initialization navigation measurements.

6. The navigational computing device as defined in claim 5, wherein the accuracy threshold is approximately 75 kilometers.

7. The navigational computing device as defined in claim 5, wherein the navigational solution manager being further configured to, responsive to the position accuracy value being less than the accuracy threshold, compute the receiver position using a multiple solutions method, the multiple solutions method being derived from multiple integer millisecond hypotheses and having approximately 32 position computations.

8. The navigational computing device as defined in claim 7, wherein the navigational solution manager being further configured to compute the receiver position using both the multiple solutions method and the initialization navigational measurements in real-time.

9. A method for computing a navigational solution, comprising the steps of:
collecting navigational data from at least one satellite vehicle;
computing a plurality of initialization navigational measurements based on the collected navigational data, the initialization navigational measurements indicating navigational accuracy of the collected navigational data;
computing the receiver position using the initialization navigation measurements if the computed initialization navigational measurements pass a corresponding initialization threshold; and
computing the receiver position independent of the initialization navigation measurements if the computed initialization navigational measurements do not pass the corresponding initialization threshold.

10. The method as defined in claim 9, wherein computing the initialization navigational measurements includes using a five (5) dimensional Doppler equation that relates position, clock and time ambiguity to the collected Doppler measurements from at least five (5) satellite vehicles.

11. The method as defined in claim 9, wherein computing the initialization navigational measurements include computing for Doppler sensitivity to position, time, clock and Dilution of Precision (DOP).

12. The method as defined in claim 11, further comprising, if the Doppler sensitivity to position, the time, and the DOP are approximately 1 Hz per Km, approximately 10 Hz, and approximately 4, respectively, then computing the receiver position to have an accuracy of approximately 40 Km.

13. The method as defined in claim 9, further comprising:
computing a position accuracy value based on the collected navigational data;
determining whether the position accuracy value is greater than an accuracy threshold; and
responsive to the position accuracy value being greater than the accuracy threshold, computing the receiver position using the initialization navigation measurements.

14. The method as defined in claim 13, further comprising configuring the accuracy threshold to be approximately 75 kilometers.

15. The method as defined in claim 13, further comprising, responsive to the position accuracy value being less than the accuracy threshold, computing the receiver position using a multiple solutions method, the multiple solutions method being derived from multiple integer millisecond hypotheses and having approximately 32 position computations.

16. The method as defined in claim 15, further comprising computing the receiver position using both the multiple solutions method and the initialization navigational measurements in real-time.

17. A navigation system comprising:
means for collecting navigational data from at least one satellite vehicle;
means for computing a plurality of initialization navigational measurements based on the collected navigation data, the initialization navigational measurements indicating navigational accuracy of the collected navigational data;
means for determining whether the computed initialization navigational measurements pass a corresponding initialization threshold;
means for computing a receiver position using the initialization navigational measurements if the initialization navigational measurements pass the corresponding initialization threshold; and
means for computing a receiver position independent of the initialization navigational measurements if the initialization navigational measurements do not pass the corresponding initialization threshold.

18. The navigation system of claim 17, wherein the initialization navigational measurements are computed using a five dimensional Doppler equation that relates position, clock and time ambiguity to the collected navigational data from at least five satellite vehicles.

19. The navigation system of claim 17, wherein the initialization navigational measurements are computed based on a Doppler sensitivity to at least one of a position, a time, a clock and a dilution of precision.

20. The navigation system of claim 17, further comprising:
means for computing a position accuracy based on the collected navigational data; and
means for determining the greater of the position accuracy and an accuracy threshold.

21. The navigation system of claim 20, wherein the means for computing a receiver position further computes a receiver position if the position accuracy is greater than the accuracy threshold.

22. The navigation system of claim 20, wherein the means for computing a receiver position further computes a receiver position using a multiple solution method if the position accuracy is less than the accuracy threshold.

* * * * *